United States Patent [19]
van der Lely

[11] 3,920,077
[45] Nov. 18, 1975

[54] PLOUGHS

[76] Inventor: Cornelius van der Lely, 7, Bruschenrain, Zug, Switzerland

[22] Filed: Sept. 10, 1973

[21] Appl. No.: 395,526

[30] Foreign Application Priority Data
Sept. 7, 1972 Netherlands.................... 7212155

[52] U.S. Cl. ................ 172/33; 172/67; 172/112
[51] Int. Cl.² ............................................ A01B 3/00
[58] Field of Search ....... 178/33, 67, 112, 710, 198, 178/706, 714, 198, 766, 446; 171/83

[56] References Cited
UNITED STATES PATENTS

| | | | |
|---|---|---|---|
| 1,214,532 | 2/1917 | Fjelstad.............................. | 172/33 |
| 1,516,561 | 11/1924 | Best.................................... | 172/20 |
| 2,071,325 | 2/1937 | Bateman et al.................. | 172/33 X |
| 2,751,830 | 6/1956 | Stauffer............................ | 172/67 X |
| 2,788,725 | 4/1957 | Wilkey et al..................... | 172/33 |
| 3,774,689 | 11/1973 | van der Lely et al............ | 172/112 |

*Primary Examiner*—Stephen C. Pellegrino
*Attorney, Agent, or Firm*—Mason, Mason & Albright

[57] ABSTRACT

A plough has forward soil-loosening means, soil-elevating elements and a soil-crumbling mechanism mounted under a screen. The plough has a beamed frame and side plates between which the elements and crumbling mechanism are rotatably mounted. A forward coupling assembly includes two arched beams that can be interconnected at several spaced apart points so that the plow can be placed at various locations behind a prime mover. The power take off is in driving engagement with the elements and crumbling mechanism. The soil-loosening means can be forwardly extending tines that are bolted in holders with the latter being pivotably mounted and spring biased to operative positions. The front of the plough rests on ground wheels with means to adjust the working level of the tines or other loosening means.

11 Claims, 12 Drawing Figures

PLOUGHS

This invention relates to ploughs of the kind comprising a frame and a member for loosening soil during the use of the plough, said member extending transverse to the intended direction of operative travel of the plough.

Conventional ploughs form slices of loosened soil and more or less gradually and more or less completely invert those slices into the furrows from which the slices were loosened. However, such slices often retain their cohesion to a large extent, particularly upon heavy soils, and further cultivation is required to produce a consistency suitable for such purposes as seed sowing. The present invention seeks to avoid or reduce this disadvantage.

According to one aspect of the invention, there is provided a plough of the kind set forth, wherein at least one rotatable soil-elevating element is located immediately behind the loosening member with respect to the intended direction of travel of the plough, said element extending transverse to said direction and being arranged to move loosened soil towards a crumbling member during the use of the plough, said crumbling member also extending transverse to said direction and being located rearwardly of the soil-elevating element relative to that direction.

For a better understanding of the invention, and to show how the same may be carried into effect, reference will now be made, by way of example, to the accompanying drawings, in which.

Figure 1:
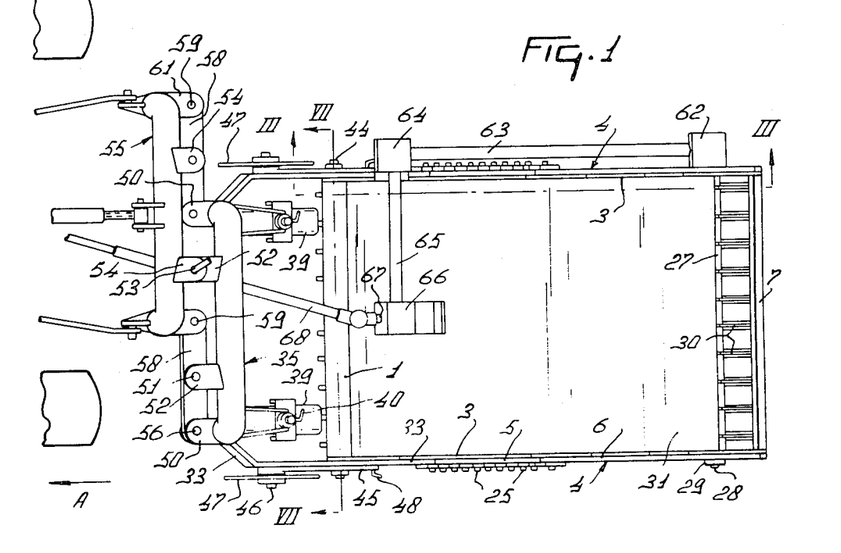
FIG. 1 is a plan view of a plough in accordance with the invention connected to the rear of an agricultural tractor.

Referring to FIGS. 1 to 7 of the drawings, the soil cultivating implement or plough that is illustrated has a frame that includes two substantially horizontal beams 1 and 2 that both extend substantially perpendicular to the intended direction of operative travel of the plough which is indicated in FIG. 1 of the drawings by an arrow A. The substantially parallel beams 1 and 2 are spaced from one another in the direction A with the rearward beam 2 located at a lower horizontal level than the leading beam 1 (see FIG. 3). Both of the two frame beams 1 and 2 are of tubular formation and circular cross-section but the leading beam 1 is of smaller diameter than the beam 2. The two beams 1 and 2 are of equal lengths and their opposite ends are fastened to substantially vertical plates 3 that both extend parallel to the direction A, the shapes of said plates 3 being visible most clearly in FIG. 3 of the drawings. Lower edge regions of both plates 3 are provided with stiffening strips 4 each of which strips comprises a straight portion 5 that is inclined upwardly from a location just in front of the frame beam 2 and also rearwardly with respect to the direction A, the upper and rearmost end of each straight portion 5 integrally joining a further substantially horizontal portion 6 that extends rearwardly therefrom with respect to the direction A. The rearmost ends of the two portions 6 of the stiffening strips 4 are interconnected by a bar 7 of L-shaped cross-section that extends parallel to the frame beams 1 and 2.

Figure 3:
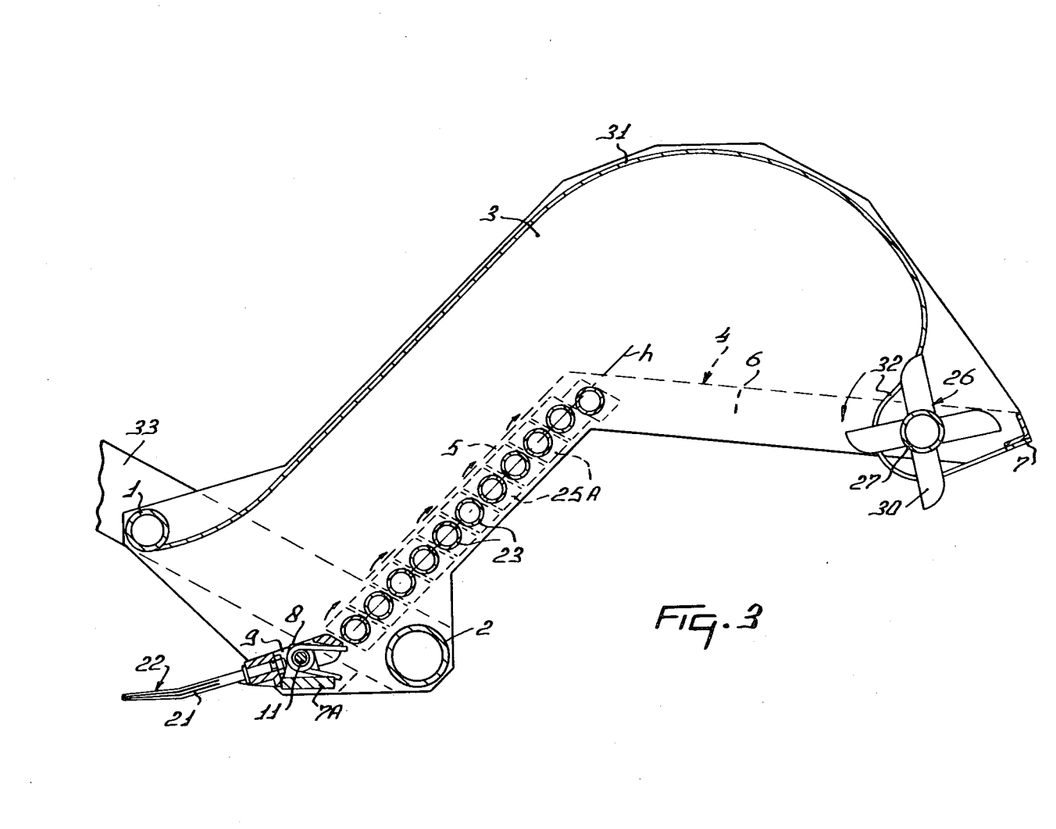
FIG. 3 is a section, to an enlarged scale, taken on the line III—III of FIG. 1.
Figure 4:
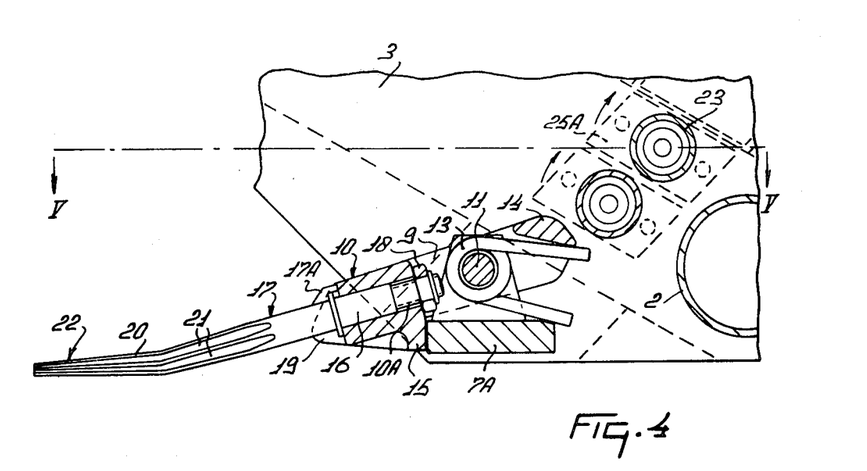
FIG. 4 is a scrap side elevation, to an enlarged scale, showing the construction and arrangement of a part that is visible in FIGS. 2 and 3 of the drawings in greater detail.
Figure 5:
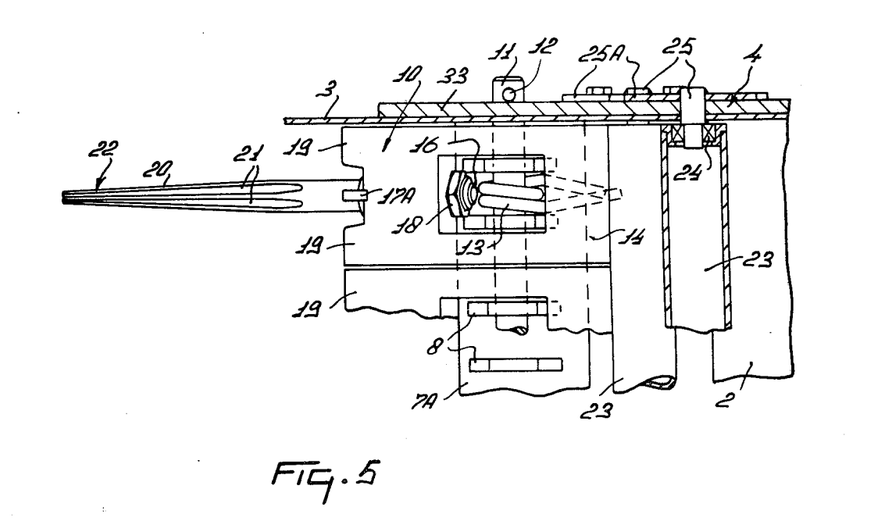
FIG. 5 is a section taken on the line V—V of FIG. 4.
Figure 6:
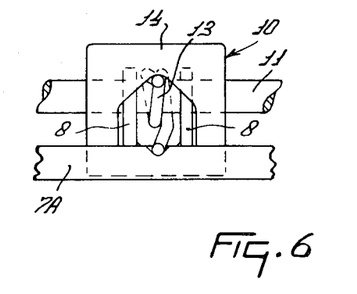
FIG. 6 is a scrap rear view of parts that can be seen in FIGS. 4 and 5.
Figure 7:
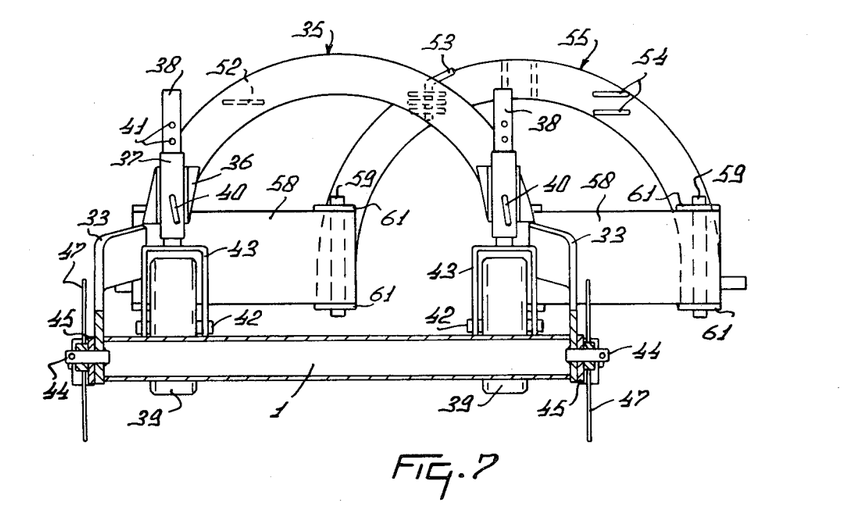
FIG. 7 is a section, to an enlarged scale, taken on the line VII—VII of FIG. 1, FIG. 8 corresponds to FIG. 3 but illustrates an alternative construction of some parts.

The substantially vertical plates 3 are interconnected at the level of the bottom of the frame beam 2, and at a location between the frame beams 1 and 2 with respect to the direction A, by a support 7A that is parallel to the frame beams 1 and 2. The support 7A is provided at regular intervals along its length with pairs of substantially vertical lugs 8, said lugs 8 projecting upwardly into recesses 9 formed in corresponding interconnected cast iron holders 10. Each holder 10 is substantially rectangular when seen in plan view and is pivotable with respect to the support 7A about the axis of a substantially horizontal shaft 11 that is common to all of the holders 10. The shaft 11 is entered through aligned holes in the holders 10 and in the lugs 8 and also through holes in the two substantially vertical plates 3 and their stiffening strips 4. Transverse pins 12 (FIG. 5) are entered through end regions of the shaft 11 beyond the relatively remote sides of the two stiffening strips 4 to prevent any appreciable axial displacement of the shaft 11. That portion of the shaft 11 which is located inside one of the recesses 9 between the corresponding pair of lugs 8 is surrounded by a corresponding helical spring 13 one end of which co-operates with a stop 14 at the top and rear of the holder 10 concerned while its opposite end bears against the top and rear of the support 7A. Each holder 10 is thus urged by its spring 13 to turn about the shaft 11 in an anticlockwise direction as seen in FIG. 4 of the drawings so that a stop 15 of each holder 10 is normally caused to abut against the front of the support 7A with respect to the direction A. Each holder 10 is formed with a hole 10A that receives a fastening portion 16 of a corresponding tine 17. The rearmost end of each fastening portion 16 with respect to the direction A is screw-threaded and receives a corresponding clamping nut 18 which, when tightened, anchors the fastening portion 16 concerned firmly in its hole 10A. When tightened, each nut 18 is located between the corresponding pair of lugs 8 in the recess 9 of the holder 10 concerned (see FIG. 5 of the drawings). The front of each holder 10 with respect to the direction A is formed with a recess that accommodates a projection 17A of the corresponding tine fastening portion 16, the recess and projection 17A co-operating to prevent the tine 17 from turning about the longitudinal axis of its fastening portion 16. Each holder 10 is formed with downwardly directed screening portions 19 at the front thereof with respect to the direction A and at opposite sides of the corresponding hole 10A.

Each tine 17 includes a leading operative or soil working portion 20 that is integral with the corresponding fastening portion 16 and that normally projects forwardly and downwardly from the latter in longitudinal alignment therewith but the leading extremity of which is bent over upwardly so as normally to extend substantially horizontally. An angle of substantially 15° is enclosed between the longitudinal axes of the leading bent-over extremity and the remainder of the operative or soil working portion 20. The operative or soil working portion 20 of each tine 17 tapers gently in a forward direction towards its tip and is of square or other angular cross-section. The flat surfaces between the corners of the square or other angular cross-section are formed with grooves 21 each of which extends throughout the whole of the portion 20 concerned or at least a major part of the length thereof. The mounting of the tines 17 is such that, when a square cross-section is chosen for their portions 20, one diagonal of each such cross-section is substantially vertically disposed while the other diagonal is substantially horizontally disposed. In the embodiment which is illustrated in FIGS. 1 to 7 of the drawings, there are ten of the holders 10 and corresponding tines 17 connected to the single support 7A. It is emphasised that this number is not essential and that either a greater or lesser number of holders 10 and tines 17 may be provided when desired. The ten tines 17, or other number thereof, together constitute a member 22 for loosening a layer of soil throughout a predetermined width. Immediately behind the rear ends of the holders 10 a row of rotatable elevating elements 23 is provided which row extends parallel to the support 7A in such a way that a line *h* (FIG. 3) perpendicularly interconnecting substantially all of the axes of rotation of the elements 23 is inclined upwardly from the rear of the row of holders 10 and also rearwardly with respect to the direction A. It will be noted from FIG. 3 of the drawings that the axis of rotation of the uppermost and rearmost of the elements 23 does not intersect the line *h* but is located a short distance beneath that line. As seen in FIG. 3 of the drawings, the line *h* substantially coincides with the longitudinal axis of the straight portion 5 of each of the stiffening strips 4. Each of the rotatable elements 23 comprises a corresponding tube whose opposite ends carry horizontal bearings 24 (FIG. 5) that surround stub shafts 25 which are fastened to the portions 5 of the stiffening strips 4 by corresponding rhomboid plates 25A. A rotatable crumbling member 26 extends parallel to the frame beams 1 and 2 between the substantially vertical plates 3 near the rear ends of the stiffening strip portions 6. The crumbling member 26 comprises a tubular support 27 having stub shafts 28 at its opposite ends which stub shafts are received in horizontal bearings 29. The support 27 is provided at regular intervals along its length with blades 30 that project from the support at substantially 90° intervals around the axis of rotation of the latter (see FIG. 3). A screen or baffle 31 extends between substantially the uppermost edges of the two vertical plates 3 and, as can be seen in FIG. 3 of the drawings, commences at the frame beam 1, extends upwardly and rearwardly therefrom and has a rearmost curved portion whose axis of curvature substantially corresponds with the axis of rotation of the crumbling member 26. The rearmost extremity of the screen or baffle 31 is secured to the bar 7. The curved portion of the screen or baffle 31 that has just been mentioned is located principally in front of the tubular support 27 with respect to the direction A and is formed with a plurality of spaced slots 32 each of which slots co-operates with one of the blades 30 during rotation of the crumbling member 26, said blades 30 passing repeatedly through the slots 32.

Supporting strips 33 project upwardly and forwardly with respect to the direction A from the two substantially vertical plates 3 at the opposite ends of the frame beams 1 and 2, leading portions of said strips 33 being inclined inwardly so as to converge towards one another (see FIG. 1 of the drawings). The portions of the strips that have just been mentioned are secured to the lower ends of substantially vertical limbs 34 of an arched frame beam 35 of generally inverted U-shaped configuration (see FIG. 7 of the drawings). Substantially vertical sleeve-like holders 37 are connected to the rear of each of the two limbs 34 by corresponding brackets 36, said holders 37 receiving mounting shafts 38 for two ground wheels 39 that are rotatably mounted in forked brackets 43 at the lowermost ends of the mounting shafts 38 by means of horizontal axles 42. Each mounting shaft 38 is formed with a plurality of transverse holes 41 at different horizontal levels, the shafts 38 being movable upwardly and downwardly through the sleeve-like holders 37 and horizontal locking pins 40 being provided that can be entered through holes in the walls of the holders 37 and through chosen holes 41 to locate the ground wheels 39 at corresponding levels relative to the frame of the plough. It will be noted that the locking pins 40 also prevent the mounting shafts 38 from turning angularly in the holders 37 to any appreciable extent.

Substantially horizontally aligned stub shafts 44 (FIG. 7) are secured to the two supporting strips 33 in axial alignment with the opposite ends of the frame beam 1 and corresponding arms 45 are turnable about the two stub shafts 44 with the aid of bearings that are not illustrated in the drawings. The arms 45 project forwardly from the stub shafts and their leading ends carry further corresponding substantially horizontal stub shafts 46 upon which cutting discs 47 are freely rotatable. The arms 45 also project downwardly and rearwardly from the arms 44 with respect to the direction A and their rearmost ends are provided with horizontal locking pins 48 that can co-operate with chosen holes 49 in the strips 33 to retain the arms 45, and thus the cutting discs 47, in corresponding angular settings about the common axis of the two stub shafts 44. The holes 49 that have just been mentioned are, of course, all equidistant from the common axis of the two stub shafts 44. Substantially horizontal lugs 50 project forwardly from the front of the two limbs 34 of the arched frame beam 35 in vertically spaced apart relationship and the curved portion of the beam 35 is also provided with two forwardly projecting strong tags 52 each of which is horizontally disposed and each of which is formed with a corresponding hole 51. The two tags 52 are horizontally spaced apart from one another to the extent that can be seen best in FIGS. 1 and 7 of the drawings. The arrangement of the two tags 52 is, in fact, such that they are spaced at equal distances from the opposite sides of a vertical plane containing the uppermost point of the beam 35 and extending parallel to the direction A. A substantially vertical locking pin 53 can be entered through the hole 51 in one of the tags 52 and through similar holes in a pair of substantially horizontal tags 54 carried at the rear of a further arched frame beam 55 that is basically similar to the arched frame beam 35. As can be seen in the drawings, and particularly in FIGS. 1 and 7 thereof, the curved portion of the beam 55 is provided with a second pair of the tags 54, the dispositions of the two pairs of tags 54 relative to the uppermost point of the beam 55 being the same as those of the tags 52 relative to the uppermost point of the beam 35. The front of the beam 55 with respect to the direction A is provided with coupling points arranged for co-operation with the three-point lifting device or hitch of an agricultural tractor or other vehicle in the general manner which can be seen in outline in FIGS. 1 and 2 of the drawings. Arms 58 that have a considerable vertical extent are pivotally connected to the lugs 50 at the front of the limbs 34 of the beam 35 by substantially vertical shafts 56, the leading ends of said arms 58 being similarly pivotally connected to vertically spaced apart lugs 61 by substantially vertical pivots 59, the lugs 61 being mounted at the rear of the limbs of the arched frame beam 55. It will be apparent from the drawings, and particularly from FIG. 1 thereof, that the pivotally interconnected arched beams 35 and 55 can be substantially rigidly connected to one another in either chosen one of two alternative positions by causing one or the other of the two tags 52 to co-operate with one or the other of the two pairs of tags 54, the locking pin 53 being entered through the holes in the co-operating tags in the manner shown in FIGS. 1 and 7 of the drawings in respect of one of the two possible relative positions of the beams 35 and 55. It is also possible to dispense with the use of the locking pin 53 in which case the arms 58 will normally extend substantially parallel to the direction A as seen in plan view (FIG. 1) and the plough will be located approximately centrally with respect to the path of travel of its operating agricultural tractor or other vehicle. When, on the other hand, the locking pin 53 is employed temporarily to interconnect one of the tags 52 and one of the pairs of tags 54, the path of travel of the plough will be located at one side of the path of travel of its operating tractor or other vehicle as shown in FIG. 1 of the drawings or, when the alternative tags 52 and 54 are employed, at the relatively opposite side of that path of travel.

The rotatable crumbling member 26 that is located substantially at the rear of the plough is driven from one end thereof from members contained within a gear box 62. Drive is transmitted to the gear box 62 from a further gear box 64 by way of a shaft contained within a protective casing 63. Drive is transmitted to the gear box 64 from a further gear box 66 by way of a further rotary shaft contained within a casing 65, the gear box 66 being located on top of the screen or baffle 31. The gear box 66 has a rotary input shaft 67 which can be placed in driven connection with the power take-off shaft of the operating tractor or other vehicle by way of an intermediate telescopic transmission shaft 68 that is of a construction which is known per se having universal joints at its opposite ends. The shaft 67 extends generally forwardly from the gear box 66 with its axis of rotation contained in a vertical plane that is parallel to the direction A. In the use of the plough, the intermediate telescopic transmission shaft 68 passes beneath the arched frame beams 35 and 55 which afford adequate clearance while also serving a protective function for the shaft 68.

Figure 2:
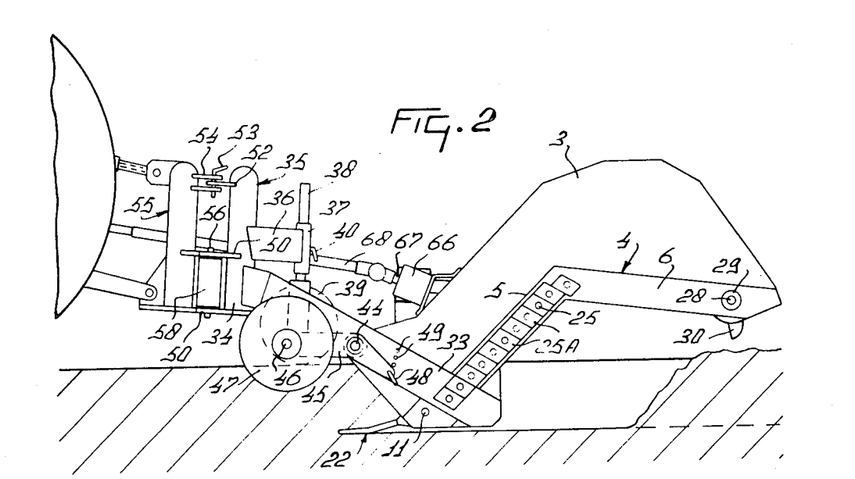
FIG. 2 is a side elevation of the plough of FIG. 1.

In the use of the soil cultivating implement or plough that has been described with reference to FIGS. 1 to 7 of the drawings, the beam 55 is connected to the three-point lifting device or hitch of an operating agricultural tractor or other vehicle in the manner that has been described and that is shown in outline in FIGS. 1 and 2 of the drawings and the leading end of the telescopic transmission shaft 68 is placed in driven connection with the power take-off shaft of the same tractor or other vehicle. As previously discussed, the plough, with the exception of the beam 55, can be located either substantially centrally of the path of travel of the operating tractor or other vehicle or towards the right or towards the left (as illustrated) of that path of travel. The upwardly and downwardly adjustable cutting discs 47 are so disposed that they will cut slots in the soil at either side of the member 22 that is afforded by the row of tines 17. The slice of soil that lies between the cuts made by the discs 47 is displaced by the tines 17 of the loosening member 22 during forward movement of the plough in the direction A, the displaced soil being moved onto the rotatable elements 23 that are located immediately behind the tines 17 and that elevate that soil due to the adjacend disposition of the successive elements 23 which disposition is such that said elements feed the displaced soil from one to the other. The displaced soil is thus conveyed obliquely upwardly and rearwardly with respect to the direction A by the elements 23, the uppermost and rearmost element 23 that is located principally beneath the line $h$ as seen in FIG. 3 of the drawings moving that soil into the sphere of influence of the rotatable crumbling member 26. The blades 30 of the crumbling member 26 move repeatedly through the slots 32 and break up any remaining lumps of soil so that they fall back towards the earth in a finely divided condition. Any stones or other heavy objects that aree displaced upwardly beneath the screen or baffle 31 by the rotatable elements 23 will tend to fall quickly back towards the earth where they will subsequently be covered by the finely divided soil that takes longer to be returned downwardly by gravity. The depth of the slice of earth that is loosened by the member 22 can be varied by appropriate upward or downward adjustment of the ground wheels 39 in the manner that has been described above. The plough produces a very intensively crumbled layer of earth of a desired thickness in a simple manner, the worked soil normally being in a condition in which it is immediately ready for the reception of seeds without further treatment.

Figure 8:
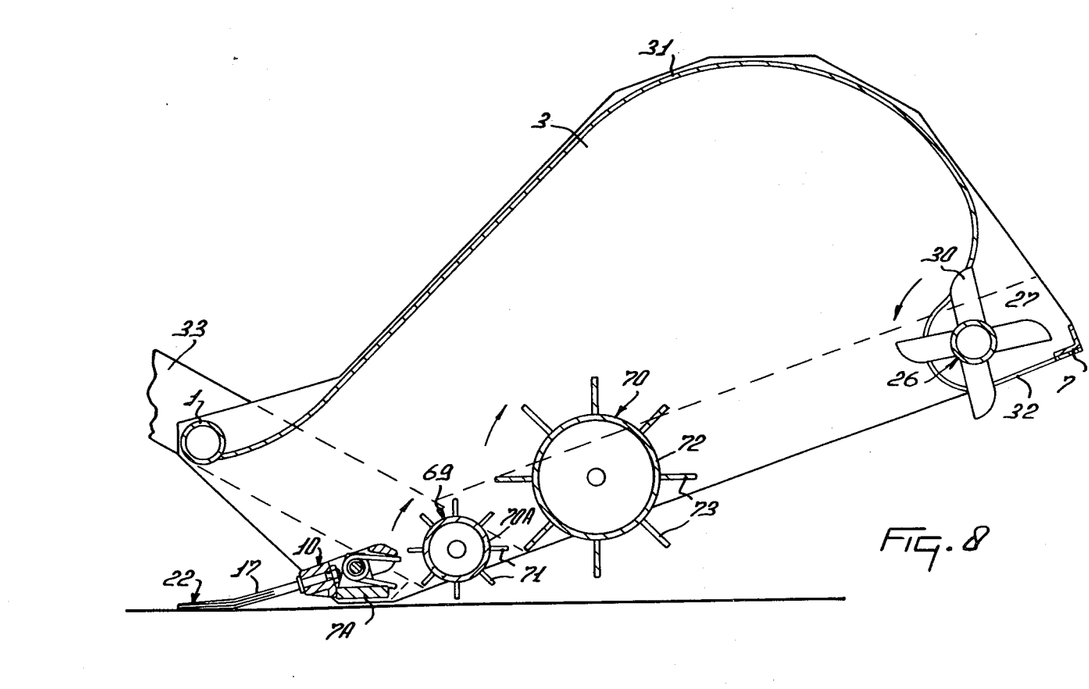

FIG. 8 of the drawings illustrates an alternative construction in which two elevating elements 69 and 70 are provided behind the tines 17 with respect to the direction A in place of the rotatable elevating elements 23. The plough of FIG. 8 is otherwise substantially identical to the plough of FIGS. 1 to 7 inclusive. As seen in FIG. 8 of the drawings, a straight line intersecting the axes of rotation of the two elements 69 and 70 is inclined upwardly and rearwardly with respect to the direction A away from the tines 17. The leading rotatable elevating element 69 is arranged immediately behind the row of holders 10 and comprises a cylinder 70A having a plurality, such as eight, of radial blades 71 that project from the outer surface thereof at regular angular intervals around the axis of rotation. The axis of rotation is defined principally by substantially vertical bearings (not shown) that are connected to the plates 3 at the lateral sides of the plough. Earth loosened and displaced by the tines 17 during the use of the plough is received in the spaces between the blades 71 and is moved upwardly and rearwardly by the element 69 in the direction indicated by an arrow in FIG 8. As seen in FIG. 8 of the drawings, the rear ends of the holders 10 occupy substantially tangential positions with respect to the circular figure that is traced by the free ends of the blades 71 of the element 69 during the rotation of the latter. The second rearward elevating element 70 is larger than the element 69 but is of a generally similar construction. It comprises a supporting cylinder 72 having a diameter that is substantially twice that of the cylinder 70A and a plurality, such as eight, of radial blades 73 that are secured to the outer surface of the cylinder 72 in regular angularly spaced apart relationship around the axis of rotation of the element 70. The blades 73 extend throughout the axial length of the cylinder 72 as do the blades 71 with respect to the cylinder 70A. The gaps or spaces between the blades 73 receive some soil displaced by the element 69 and some larger lumps of soil displaced directly by the tines 17 and move that soil upwardly and rearwardly in the direction indicated by an arrow in FIG. 8. As seen in FIG. 8 of the drawings, a line that is perpendicular to a line joining the axes of rotation of the two elements 69 and 70, and that is located between the blades 71 and 73 of the respective elements 69 and 70, is substantially tangential to a circle containing the free ends of all the blades 71 and to a further circle containing the free ends of all the blades 73. The drive transmission to the elements 69 and 70 is not shown in FIG. 8 of the drawings but is established by way of intermediate gear boxes in the drive transmission to the rotatable crumbling member 26.

In the operation of the plough of FIG. 8 of the drawings, the soil that is loosened and displaced by the tines 17 is moved upwardly and rearwardly with respect to the direction A by the rotating elements 69 and 70, the greater part of that soil being displaced over the tops of those elements between the blades 71 and the blades 73. The circumferential speed of movement of the element 70 is greater than that of the element 69 and is sufficient to throw the displaced earth rearwardly towards the sleeve or baffle 31 and the rotatable crumbling member 26. As in the previous case, any remaining unbroken lumps are crumbled by the blades 30 and the finely divided soil falls back into the cut or furrow formed by the tines 17 and covers any heavy stones or the like which will normally fall back before the finely divided soil.

Figure 9:
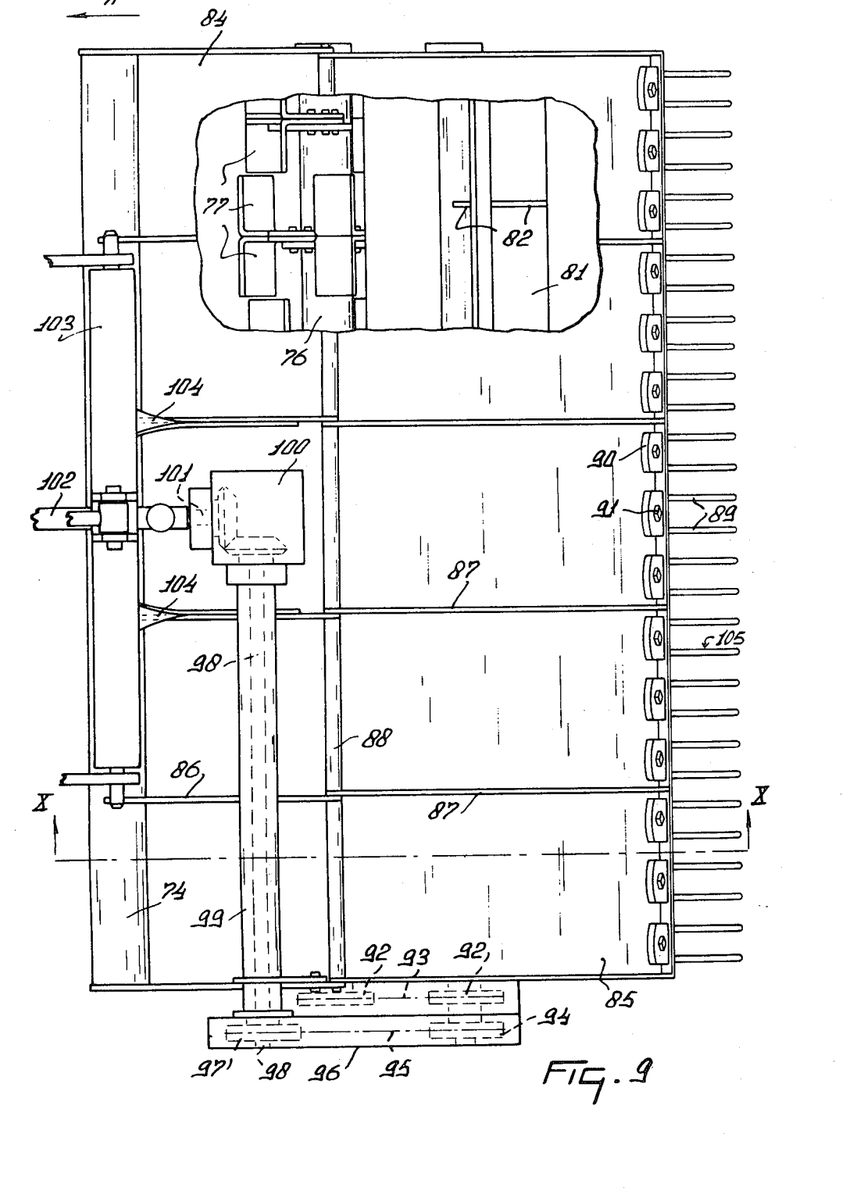
FIG. 9 is a plan view illustrating an alternative plough in accordance with the invention.
Figure 10:
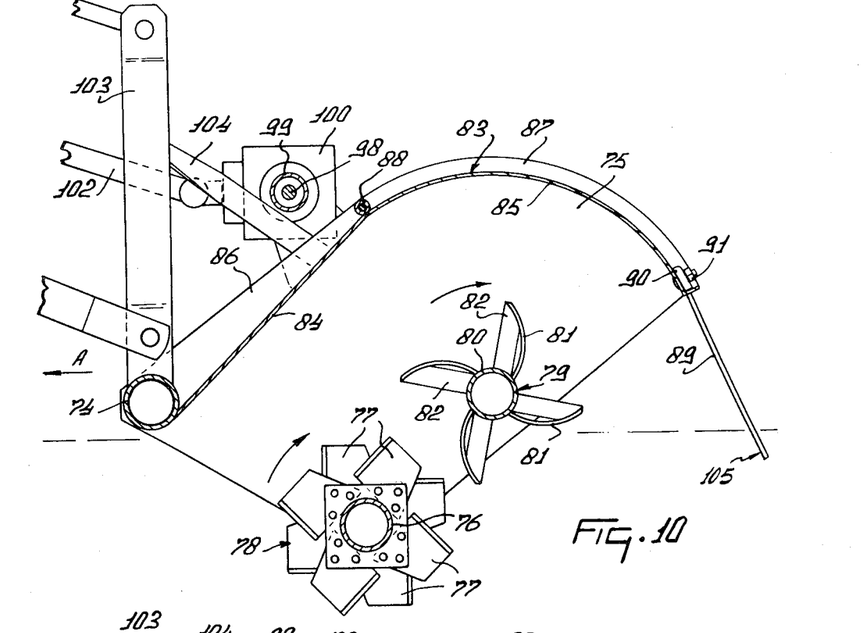
FIG. 10 is a section taken on the line X—X of FIG. 9, FIG. 11 corresponds to FIG. 10 but illustrates an alternative construction.

FIGS. 9 and 10 of the drawings illustrate a soil cultivating implement or plough which comprises a frame beam 74 that extends substantially horizontally perpendicular to the intended direction of operative travel of the plough which is again indicated by an arrow A. Substantially vertical plates 75 are fastened to the opposite ends of the frame beam 74, the shape of those plates being visible in FIG. 10 of the drawings. A rotatable tubular support 76 is provided behind the frame beam 74 with respect to the direction A so as to extend parallel to that frame beam 74 between the plates 75 and at a lower horizontal level than the frame beam. The support 76 carries a plurality of hooked knife blades 77 that are disposed in helical relationship with one another around the axis of rotation of the support 76. Each blade 77 has a substantially radial portion that projects away from the support 76 to terminate in a portion that is substantially parallel to the axis of the support. The leading edge of each blade 77 with respect to the intended direction of rotation of the support 76 that is indicated by an arrow in FIG. 10 of the drawings is formed as a sharpened and inclined cutting edge. The support 76 and its blades 77 together constitute a rotatable member 78 for loosening a layer or slice of soil. A rotatable elevating element 79 is arranged directly behind the member 78 with respect to the direction A and at substantially the same horizontal level as the frame beam 74. The element 79 is rotatably mounted between the plates 75 and, as can be seen in FIG. 10 of the drawings, its axis of rotation is at a higher horizontal level than that of the member 78. The elevating element 79 comprises a cylindrical support 80 whose outer surface is provided at regular intervals therealong with curved blades 81. The blades 81 are spaced apart from one another at 90° intervals around the axis of rotation of the element 79 as seen in FIG. 10 of the drawings and each blade 81 is sustained by a corresponding strip 82 in order to maintain that blade in the illustrated curved configuration in which the convex side of the blade is leading with respect to the intended direction of rotation of the element 79. As seen in FIG. 10, a line that is perpendicular to a line joining the axes of rotation of the member 78 and element 79, and that is located between the blades 77 and the blades 81, is tangential to a circle containing the radially outermost points of the blades 77 and to a further circle containing the radially outermost points of the blades 81.

A screen or baffle 83 which comprises two pivotally interconnected portions 84 and 85 is located between the plated 75 above the member 78 and element 79. The first portion 84 of the screen or baffle 83 is of flat configuration and extends upwardly and rearwardly with respect to the direction A away from the frame beam 74. The second portion 85 of the screen or baffle 83 is of substantially cylindrically curved configuration, the center of curvature thereof substantially coinciding with the axis of rotation of the element 79. This coincidence of position is, however, only approximate because the screen or baffle portion 85 is turnably connected to the uppermost and rearmost edge of the portion 84 thereof by a horizontal pivot shaft 88. The two portions 84 and 85 of the screen or baffle 83 are stiffened by corresponding ribs 86 and 87 that are located on the upper surfaces thereof in substantially regularly spaced apart relationship. It will be noted from the drawings that the axis defined by the pivot shaft 88 extends parallel to the longitudinal axis of the frame beam 74. The rearmost edge of the screen or baffle portion 85 with respect to the direction A is formed with an upwardly bent over rim and tines 89 that are formed in integral pairs are entered through holes in that rim, the junctions between the two tines of each pair being secured to the screen or baffle portion 85, adjacent its rim, by clamping members 90 and bolts 91. It can be seen from the drawings that the tines 89 are of straight configuration apart from the curved junctions between the integral pairs thereof and that they are arranged so as to be inclined downwardly and rearwardly with respect to the direction A away from their fastening points to a level beneath that of the axis of rotation of the elevating element 79. The tines 89 are formed from a resilient material which may conveniently be spring steel. One end of the support 76 and one end of the support 80 are each provided with stub shafts that project through the corresponding plate 75 to carry sprocket wheels 92 (FIG. 9) that are drivingly interconnected by an endless transmission chain 93. The stub shaft corresponding to the support 80 carries a further sprocket wheel 94 which is in driven connection with a sprocket wheel 97 by way of an endless transmission chain 95. The sprocket wheel 97 is mounted on a shaft 98 and it will be noted from FIG. 9 of the drawings that all of the sprocket wheels and chains that have just been mentioned are contained within a protective casing 96. The shaft 98 is contained within a tubular protective casing 99 and the end thereof that is remote from the sprocket wheel 97 is located inside a gear box 100 and carries a bevel pinion whose teeth are in driven mesh with those of a further bevel pinion carried by a forwardly projecting rotary input shaft 101 of the plough. The gearbox 100 is located approximately centrally of the plough above the first or leading portion 84 of the screen or baffle 83 and its rotary input shaft 101 can be placed in driven connection with the power take-off shaft of an operating agricultural tractor or other vehicle by way of an intermediate telescopic transmission shaft 102 of a construction that is known per se having universal joints at its opposite ends.

A coupling member 103 is fastened to the frame beam 74 and is also connected by tie bars 104 to the portion 84 of the screen or baffle 83. In the use of the plough which has been described with reference to FIGS. 9 and 10 of the drawings, its coupling member 103 is connected to the three-point lifting device or hitch of an agricultural tractor or other operating vehicle in the manner which can be seen in outline in those FIGURES and the rotary input shaft 101 of the gear box 100 is placed in driven connection with the power take-off shaft of the same tractor or other vehicle by way of the intermediate telescopic transmission shaft 102. As the plough is moved over the ground in the direction A, the member 78 and the elevating element 79 rotate in the directions indicated by arrows in FIG. 10. The loosening member 78 displaces the soil and moves it into the reach of the blades 81 of the elevating element 79 which element is located behind the member 78 at a higher horizontal level. The blades 81 throw the displaced earth towards the screen or baffle portion 85 and towards the tines 89, said tines 89 together constituting a crumbling member 105 that ensures that at least the upper surface of the deposited soil worked by the plough is in a finely divided condition. Large stones and other hard objects cannot pass between the tines 89 and fall immediately back to the bottom of the furrow cut by the rotatable member 78 whereas finely divided soil can pass readily between the tines 89 and falls back to the ground somewhat more slowly so as to cover any stones or other hard objects. With this construction, also, soil is displaced and moved by a loosening member (the member 78) to within the reach of an elevating element (the element 79), the displaced soil being returned to the ground in a finely divided form via the crumbling member 105 which is afforded by the resilient tines 89.

Figure 11:
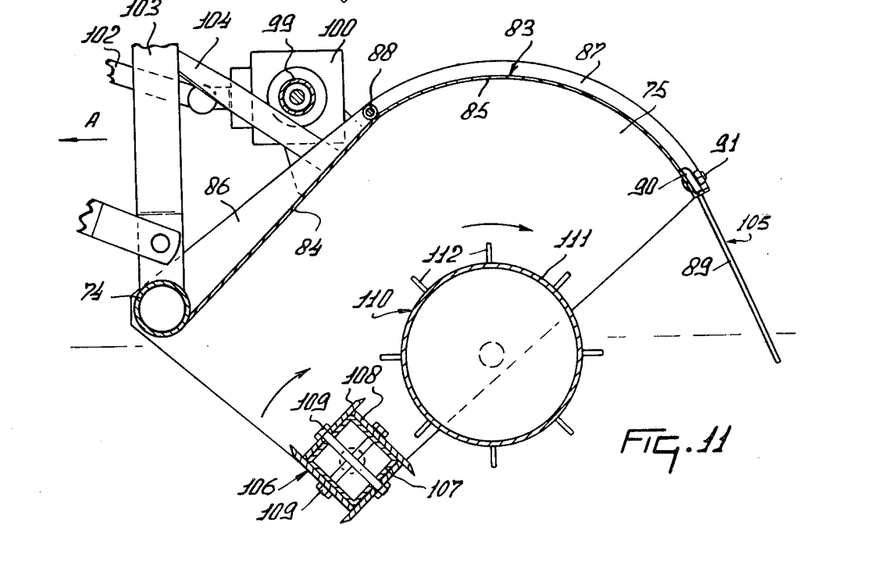

FIG. 11 of the drawings illustrates an alternative construction to that shown in FIGS. 9 and 10 in which alternative construction a rotatable member 106 for loosening a layer of soil is provided in place of the member 78, said member 106 comprising a central supporting beam 107 of square cross-section to which beam knifeedged blades 108 are secured by transverse bolts 109 in such a way that the sharpened edge of each blade 108 projects forwardly from the adjacent flat side of the beam 107 in the intended direction of rotation of the member 106 which is indicated by an arrow in FIG. 11. The member 106 is rotatably mounted between the plates 75 and soil that is loosened thereby is displaced towards an elevating element 110 that is also rotatably mounted between the plates 75 but at a higher level that the member 106 and to the rear of that member with respect to the direction A. The element 110 comprises a cylindrical support 111 whose outer surface is provided with a plurality, such as eight, of radial blades 112 that extend parallel to the axis of rotation of the element throughout the axial length thereof. The spaces between the blades 112 will receive soil displaced by the member 106 during the operation of the plough and will throw that soil rearwardly in the direction indicated by an arrow in FIG. 11 towards the portion 85 of the screen or baffle 83 and the tines 89 of the crumbling member 105. As in the embodiment of FIGS. 9 and 10 of the drawings, a line, as seen in FIG. 11 of the drawings, that is perpendicular to a line intersecting the axes of rotation of both the member 106 and the element 110, and that is located between the blades 108 and the blades 112, is tangential to a circle containing the free edges of all of the blades 108 and to a further circle containing the free edges of all of the blades 112.

Figure 12:
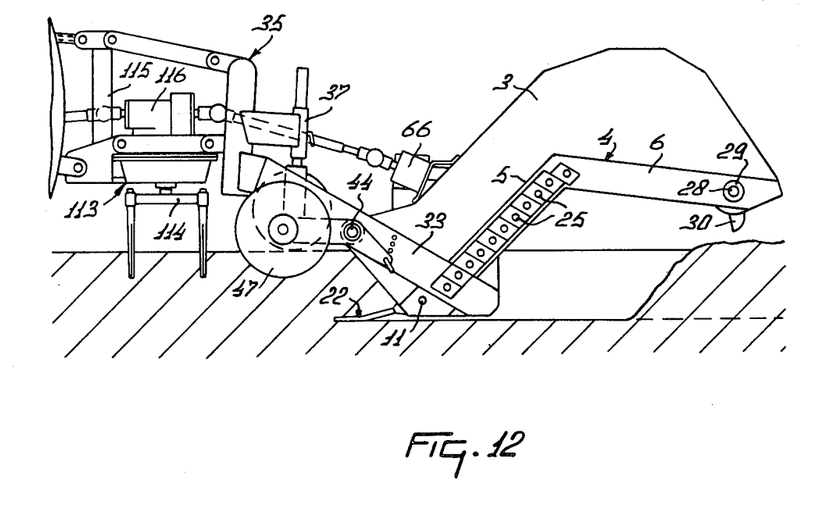
FIG. 12 is a side elevation diagrammatically illustrating the employment of the plough of FIGS. 1 to 7 of the drawings in combination with a preceding rotary harrow.

FIG. 12 of the drawings illustrates the soil cultivating implement or plough of FIGS. 1 to 7 of the drawings in combination with a foregoing rotary harrow 113. The rotary harrow 113 comprises a plurality of tined soil working members 114 that are arranged in a row that is substantially perpendicularly transverse to the intended direction of operative travel of the combination, said members 114 being rotatable about corresponding substantially vertical or at least upwardly extending axes. When the combination is in use, the soil working members 114 rotate rapidly and crumble an upper layer of the soil over which the combination is travelling, the working width of the row of soil working members 114 substantially coinciding with the path of travel of the loosening member 22. In the combination illustrated in FIG. 12, the front of the arched beam 35 is pivotally linked to a coupling member 115 of the rotary harrow 113 which coupling member is arranged for connection to the three-point lifting device or hitch of an operating agricultural tractor or other vehicle. Drive is transmitted from the power take-off shaft of the tractor or other operating vehicle to a gear box 116 mounted on the rotary harrow 113 and output shafts of the gear box 116 transmit rotation to the soil working members 114 and also transmit rotation to the input shaft 67 of the gear box 66 in the manner that can be seen in outline in FIG. 12, the rear of the gear box 116 being provided with an auxiliary power take-off shaft for that purpose. The combination diagrammatically illustrated in FIG. 12 of the drawings is particularly useful for the deep cultivation of heavy soil and provides a pre-treatment of an upper layer of the slice or furrow of soil that is loosened by the member 22. The upper layer may, for example, have a depth of between substantially 7 and substantially 12 centimeters.

Although various features of the soil cultivating implements or ploughs that have been described and/or that are illustrated in the accompanying drawings will be set forth in the following claims as inventive features, it is emphasised that the invention is not limited to those features and that it includes within its scope all of the parts of each soil cultivating implement or plough that has been described and/or illustrated in the accompanying drawings both individually and in various combinations.

What we claim is:

1. A plough movable over the ground comprising forward soil-loosening means and a plurality of freely rotatable spaced apart soil-elevating elements journalled on said plough and positioned immediately adjacent one another to the rear of said soil-loosening means with respect to the normal direction of travel of said plough, said elements extending transverse to the direction of travel and having corresponding axes of rotation located to the rear and successively above said soil-loosening means, a soil-crumbling member on said plough located to the rear of said elevating elements and the latter being positioned in echelon to receive loosened soil from said soil-loosening means and convey that soil upwardly and obliquely to the crumbling member during travel of the plough, said loosening means comprising a plurality of tines positioned in side-by-side relationship and each tine extending generally in the direction of forward travel, leading end portions of said tines with respect to said direction being substantially horizontally disposed and means pivotally mounting said tines on a substantially horizontal pivot axis, said tines being movable between stop means against resilient means about said horizontal axis and the latter extending substantially perpendicular to the direction of travel.

2. A plough as claimed in claim 1, wherein all of said tines are pivotable about a common axis.

3. A plough as claimed in claim 1, wherein said tines are pivotably mounted on shaft means and springs surround said shaft, one end of each spring cooperating with a stop forming part of a tine holder and the opposite end of said spring cooperating with a tine support, said tines being biased into operative positions by said springs.

4. A plough as claimed in claim 3, wherein each tine holder includes a stop at the front thereof with respect to the direction of travel and said stop is arranged to cooperate with said tine support whereby, a limit is defined with respect to the possible downward movement of the corresponding tine.

5. A plough as claimed in claim 1, wherein each tine has an angular cross-section, and is mounted so that as seen in cross-section, a diagonal between two opposite corners thereof extends substantially vertically.

6. A plough as claimed in claim 5, wherein grooves are formed in the faces of each tine between the corners thereof as seen in cross-section.

7. A plough as claimed in claim 6, wherein said grooves extend throughout substantially the whole of the length of the soil-working portion of each tine and said soil-working portion tapers towards its free end or tip.

8. A plough as claimed in claim 1, wherein said soil-loosening means includes tines with each tine including a screwthreaded fastening portion and a corresponding tine holder on said plow has a hole that receives said fastening portion, nuts on said portion for clamping said fastening portions in said holes, said tine being formed with a projection that lodges in a recess in said corresponding holder when the fastening portion of that tine is clamped in said hole, said projections and recesses cooperating to prevent angular displacements of said tine about the longitudinal axis of its fastening portion.

9. A plough as claimed in claim 1, wherein the axis of rotation of the rearmost element with respect to said direction of travel is located beneath a straight line which intersects the axes of rotation of the preceding elements, as seen in side elevation.

10. A plough comprising a frame movable over the ground, forward soil-loosening means and a plurality of freely rotatable spaced apart soil-elevating elements, each being journalled on said frame for independent rotation, said elements being positioned immediately adjacent one another to the rear of said soil-loosening means with respect to the normal direction of travel of said plough, said elements extending transverse to the direction of travel and having corresponding axes of rotation located to the rear and successively above one another and said soil-loosening means, said elements being positioned in echelon to receive loosened soil from said soil-loosening means and convey that soil upwardly and obliquely to the rear of the plough during the travel thereof, said soil-loosening means comprising a plurality of tines positioned in side-by-side relationship, each tine extending generally in the direction of travel, leading end portions of said tines with respect to said direction being substantially horizontally disposed and said tines being pivotable mounted and movable between stop means against resilient means about a substantially horizontal axis that extends substantially perpendicular to the direction of travel.

11. A plough as claimed in claim 10, wherein said frame has upwardly extending portions and said elevating elements are journalled in said portions.

* * * * *